United States Patent
Duval et al.

(10) Patent No.: US 6,767,602 B1
(45) Date of Patent: Jul. 27, 2004

(54) PREPARATION OF TEXTILE PREFORMS FOR BRAKE DISCS IN COMPOSITE MATERIAL

(75) Inventors: Renaud Duval, Les Cheres (FR); Eric Lherm, Rigneux le Franc (FR)

(73) Assignee: Messier-Bugatti, Villacoublay (FR)

( * ) Notice: Subject to any disclaimer, the term of this patent is extended or adjusted under 35 U.S.C. 154(b) by 0 days.

(21) Appl. No.: 09/269,430
(22) PCT Filed: Nov. 29, 1996
(86) PCT No.: PCT/FR96/01898
§ 371 (c)(1), (2), (4) Date: Mar. 26, 1999
(87) PCT Pub. No.: WO98/14716
PCT Pub. Date: Apr. 9, 1998

(30) Foreign Application Priority Data

Sep. 30, 1996 (FR) .............................. 96 11873

(51) Int. Cl.$^7$ ................................. B32B 9/00
(52) U.S. Cl. .................... 428/36.1; 156/148; 156/149; 28/107; 28/114; 28/412; 28/419.1; 28/521; 442/273; 442/319; 442/406
(58) Field of Search ................................. 156/148, 149; 428/36.1; 28/107, 114; 29/412, 419.1, 521; 442/273, 319, 406

(56) References Cited

U.S. PATENT DOCUMENTS 5,242,746 A 9/1993 Brommier et al. .......... 428/252
5,609,707 A * 3/1997 Bazshushtari et al.

FOREIGN PATENT DOCUMENTS

| EP | 0 459 916 A1 | 12/1991 |
| EP | 0 530 741 A | 3/1993 |
| FR | 2 414 574 A | 8/1979 |
| FR | 2 584 107 A | 1/1987 |
| GB | 1 410 090 A | 10/1975 |
| GB | 2 099 365 A | 12/1982 |

OTHER PUBLICATIONS

Derwent Publications Ltd., London, GB, Class E36, An 93–197019 XP002030331 & WO93 11185, Jun. 10, 1993.

* cited by examiner

Primary Examiner—Rich Weisberger
(74) Attorney, Agent, or Firm—Weingarten, Schurgin, Gagnebin & Lebovici LLP

(57) ABSTRACT

A fiber preform for manufacturing a brake disk out of composite material is itself manufactured by superposing and bonding together fiber layers. Structural fiber layers (10) are used to form at least a first preform portion that is to constitute the fiber reinforcement of the brake disk core, while the or each preform portion that is to constitute the fiber reinforcement of a friction portion of the brake disk is constituted by a felt (16, 18), at least in its portion adjacent to the friction face.

21 Claims, 6 Drawing Sheets

PREPARATION OF TEXTILE PREFORMS FOR BRAKE DISCS IN COMPOSITE MATERIAL

The present invention relates to manufacturing brake disks out of composite material, and in particular to preparing fiber preforms for such manufacture. The field of application of the invention is more particularly that of brake disks made of thermostructural composite material. Thermostructural composite materials for brake disks are typically carbon-carbon or "C—C" composites constituted by a reinforcing preform of carbon fibers densified by a carbon matrix and optionally subjected to final siliciding treatment. Other suitable composite materials are ceramic matrix composites or "CMCs" constituted by a reinforcing preform of refractory fibers (carbon or ceramic) densified by a ceramic matrix, e.g. carbon-silicon carbide or "C—SiC" composites.

The use of thermostructural composite materials, in particular C—C composites, for making brake disks is well known, in particular for the multi-disk brakes of airplanes, and also for land vehicles, e.g. F1 racing cars.

The usual technique for manufacturing such disks consists in making annular fiber preforms and in densifying them with a matrix of carbon that fills the pores of the preforms.

The preforms are usually made by superposing layers of fiber fabric which are bonded together, in particular by needling, so as to give the preform the cohesion it requires to avoid any risk of a disk delaminating while it is in use. The fiber fabric layers are typically multidirectional two-dimensional layers formed at least in part out of continuous filaments, e.g. layers made by weaving or braiding or knitting threads made up of continuous or discontinuous fibers, or layers made up of a plurality of sheets of unidirectional cables disposed in different directions and bonded together by light needling. Fiber webs or layers of felt can be added to provide discontinuous fibers that are easily taken by the needles during needling to provide Z-direction bonding between layers (i.e. transversely relative to the faces of the layers). These fiber webs or felt layers also serve to recycle the fiber scrap that is produced when cutting the fiber fabric layers as is necessary to obtain annular preforms.

The use of fiber webs or felts made from such scrap material is described in particular in documents FR-A-2 626 294 and EP-A-0 530 741. According to the latter document, the layers of felt can be interleaved between the layers of fiber fabric in the core of a preform, or they can be added to the faces of the core in order to constitute surface layers of a preform that are designed to be eliminated in machining operations that take place during and/or after densification.

Preforms can be densified by chemical vapor infiltration or by using a liquid, both of which techniques are well known. Chemical vapor infiltration consists in placing the preforms that are to be densified in an enclosure into which a matrix-precursor gas is admitted that, under controlled conditions of temperature and pressure, diffuses within the preform and forms a deposit of matrix material on the fibers by reaction between its own components or by decomposition. When deposition takes place preferentially in the surface pores of the preform, tending to close them prematurely, it can be necessary to proceed with one or more intermediate surface-machining or "descaling" operations in order to recover surface pores and allow densification to proceed to the core of each preform.

Densification by means of a liquid consists in impregnating a preform with a matrix precursor in the liquid state, e.g. a resin, and then transforming the precursor, generally by heat treatment. Several consecutive impregnation cycles can be necessary in order to achieve the desired degree of densification. It is also possible to combine the techniques of chemical vapor infiltration and of liquid impregnation.

Compared with metal disks, brake disks made of thermostructural composite material, and in particular of C—C composite material, provide a considerable saving in mass while providing excellent tribological properties and low wear. They are also well adapted to the severe conditions of use encountered in airplanes and in F1 racing cars.

Extending the use of thermostructural composite brake disks to other types of vehicle, such as trains, heavy trucks, coaches, utility vehicles, or private cars is being slowed down specifically because of particular problems encountered in such use.

Thus, tests performed by the Applicant on a top-of-range private car with C—C composite brake disks made using a method analogous to that used for manufacturing airplane brake disks have demonstrated that they can sometimes give rise to undesirable vibration, and to braking torque that can be irregular. In those brake disks, the preforms were made by needling together layers of base texture, which texture was made up of a plurality of unidirectional sheets of cables disposed at different angles (e.g. three sheets at 0°, +60°, and −60° C.) that were themselves preneedled together. It is likely that the use of that base fabric gives rise to irregular wear of the friction faces of the disks that come into contact with the brake pads, which phenomenon gets worse over the lifetime of the brake disks and generates vibration.

An object of the present invention is to provide a method of preparing fiber preforms that enables brake disks to be made out of composite material that do not present those drawbacks.

A particular object of the present invention is to provide such a method enabling brake disks to be made of composite material that are suitable for use on industrial or private motor vehicles without generating undesirable vibration and regardless of braking conditions, while also delivering braking torque that is regular and without any wear that is abnormally fast.

Another object of the present invention is to obtain such performance at a cost price that is compatible with the brake disks being used in mass-produced industrial or private motor vehicles.

Such objects can be achieved by a method of the type comprising superposing and bonding together fiber layers comprising structural layers formed at least in part out of continuous filaments and out of at least one felt layer, in which method structural fiber layers are used to form at least a first preform portion that is to constitute the fiber reinforcement of the core of the brake disk, while the or each preform portion that is to constitute the fiber reinforcement of a friction portion of the brake disk is constituted by a felt, at least in its portion adjacent to the friction face.

The term "structural fiber layer formed at least in part out of continuous filaments" is used herein to mean a layer that is woven, braided, or knitted out of continuous threads, themselves made of continuous or discontinuous fibers, or a layer constituted by a sheet of unidirectional, continuous cables, twisted strands, or threads, the cables, strands, or threads, themselves being constituted by continuous or discontinuous fibers, or else a layer constituted by a plurality of such sheets superposed in different directions and bonded together, e.g. by preneedling, or indeed such a fiber layer associated with a thin web of fibers to which it is bonded, e.g. by light needling. Such structural fiber layers are used to constitute a preform portion that is suitable for conferring to the core of the brake disks the mechanical properties which are required for transmitting braking forces without rupturing or damaging the disks, in particular where the core is mechanically linked to the member with which the disk is bound in rotation. The structural fiber layers can be placed flat, parallel to the faces of the disks, or they can be wound around the axis of the disks. If they are wound, the portion of the preform corresponding to the core of the disk can be obtained by cutting slices from a sleeve obtained by rolling up a strip of structural fiber fabric on a mandrel to form layers that are superposed on one another.

The felt forming, at least a part of the or each portion of the preform that is to constitute the fiber reinforcement of a friction portion of the brake disk is in the form of at least one relatively thick layer having fibers at a low volume density, preferably less than 20%, where fiber volume density is the fraction of the apparent volume of the felt that is actually occupied by the fibers. The term "relatively thick felt layer" is used herein to mean a felt which, in the prepared preform, is of a thickness that is not less than about 1 mm. After densification, the major portion of the friction lining in the vicinity of the friction face is constituted by the composite material matrix. Typically, the friction lining in the vicinity of the friction face has 10% to 15% by volume of fibers, 65% to 75% by volume of matrix, and 15% to 20% by volume of residual open pores.

By having a preform of this structure, and in particular by having felt present in the vicinity of the friction face, no undesirable vibration appears during braking, contrary to that which has been observed with brake disks in which the preform is constituted by needled structural fiber layers, even in the friction portions. Such vibration can be due to wear of the friction face that becomes irregular in the long term. The presence in the friction portion of felt, i.e. of non-oriented short fibers, instead of structural fiber layers, and also the occupation of the majority fraction by the matrix, give rise to smaller anisotropy and less rigidity, thus avoiding the appearance of wear irregularities, or promoting attenuation thereof.

In addition, it has been observed that the braking torque is remarkably regular. Furthermore, the performance obtained is just as good in a wet environment as it is in a dry environment.

It can be envisaged to use felt not only for the or each portion of the preform that corresponds to a friction portion of a disk, but also to form preferably thin layers that are interleaved between structural fiber layers in the first portion of the preform that corresponds to the core of the disk. When structural fiber layers are disposed parallel to the faces of the disk, this contributes to imparting a certain amount of flexibility to the disk in the axial direction and increases its capacity to absorb vibration.

The layers constituting the first portion of the preform corresponding to the core of the disk are preferably bonded together by needling. The felt constituting at least in part the or each portion of the preform corresponding to a friction portion of the disk can be formed as a single layer or as a plurality of superposed layers that are likewise advantageously bonded together by needling. Bonding between the felt and the first portion of the preform can also be performed by needling. It should be observed that under such circumstances the felt must be needled without being compressed in such a way as to increase the fiber volume density above the desired maximum.

An annular brake disk preform can be made from plane fiber layers either by superposing and bonding together fiber layers that are precut to an annular shape, or else by superposing and bonding together optionally circular fiber layers without any center holes, and subsequently cutting the preform through all of the superposed and bonded together fiber layers. It is also possible to make the portion of the preform that corresponds to the core of the disk by winding a fiber fabric as superposed layers which are bonded together, while the or each portion of the preform corresponding to a friction portion of the disk is made by superposing and bonding together fiber layers that are plane.

According to another aspect, the invention also provides a method of manufacturing brake disks out of composite material by densifying preforms prepared in the manner given above.

Advantageously, to manufacture an assembly comprising both a central rotor brake disk having two opposite friction faces and also two end stator brake disks having one friction face each, e.g. for an industrial vehicle disk brake (heavy truck or coach), four substantially identical component preforms are made, each having a first portion corresponding to a core portion and a second portion corresponding to a friction portion, the preforms are densified, and the rotor disk is obtained by putting two densified preforms together via their faces opposite from their friction faces. This means that rotor disks and stator disks become different only after they have been densified. It is also possible to envisage assembling two component preforms prior to densification in order to obtain a rotor disk preform, in which case rotor disks and stator disks become different after the preforms have been prepared, but before densification.

According to yet another aspect, the invention provides disk brakes manufactured from preforms prepared in the manner given above.

Implementations to the invention are described below by way of non-limiting indication. Reference is made to the accompanying drawings, in which.

The description below relates to preparing preforms out of carbon fiber or of carbon precursor for the purpose of manufacturing brake disks out of C—C composite material. Nevertheless, it should be observed that the invention is applicable to disk brakes made of composite material other than C—C, in particular composite material having reinforcing fibers and/or a matrix that is, at least in part, made out of a ceramic, e.g. at least in part out of SiC, or out of a silicided C—C composite material.

Figure 1:
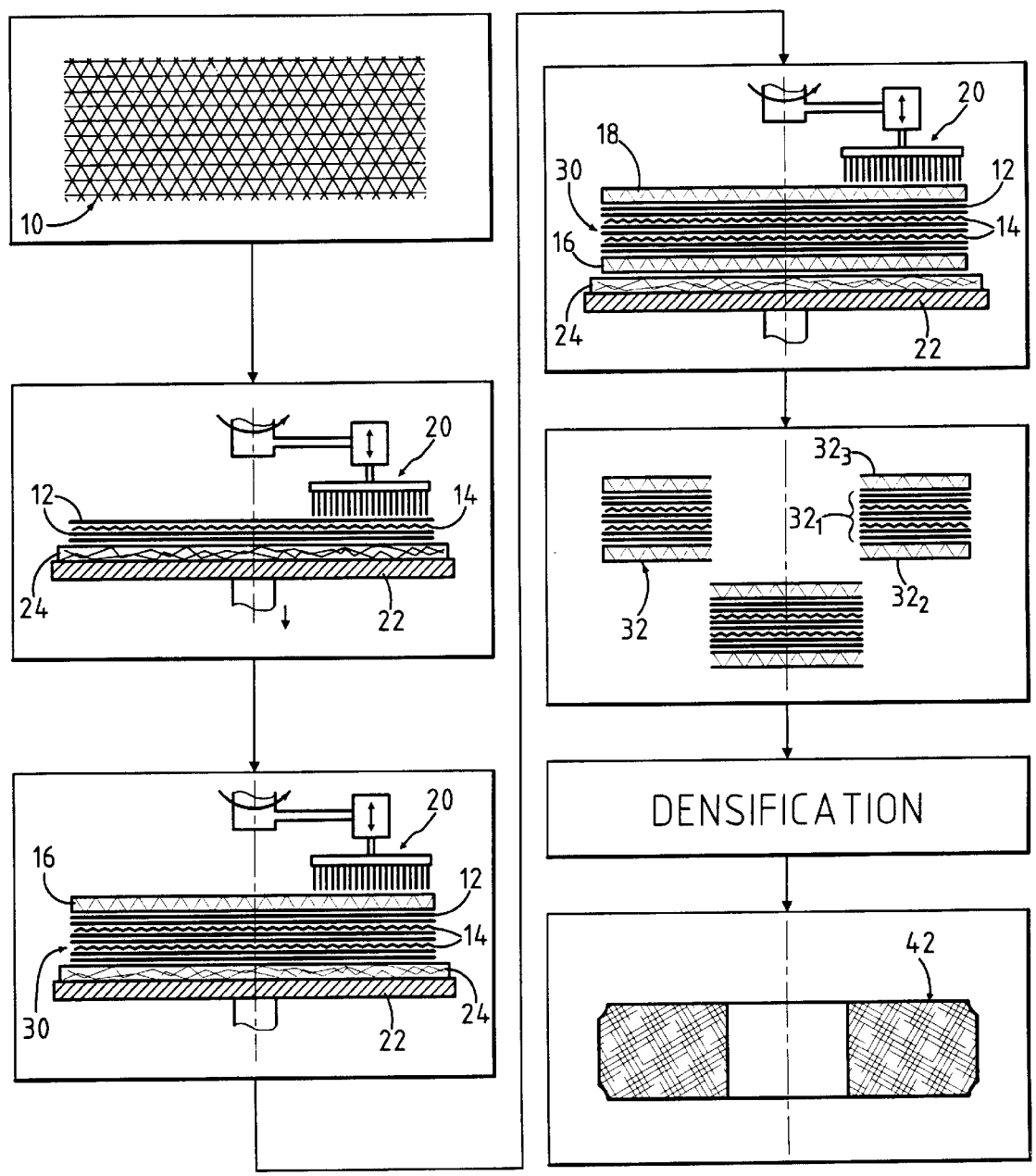
FIG. 1 shows the successive steps in making an annular preform for a disk brake in an implementation of the method of the invention.

An annular preform for a disk brake having two friction faces, e.g. a disk brake designed to co-operate with brake pads in a motor vehicle brake, such as a mass-produced private car, can be made as follows (FIG. 1).

The starting material used for the portion of the preform that corresponds to the core of the disk is a base fabric 10 made from fibers of carbon or a carbon precursor, which precursor could be, for example, pre-oxidized polyacrylonitrile (PAN), pitch, rayon, or a phenol compound. When the preform is made from carbon precursor fibers, the precursor is transformed by heat treatment, preferably after the preform has been prepared and before it is densified. It will be observed that the preform that can be obtained with carbon fibers from a plurality of different precursors.

The base fabric 10 is made at least in part out of continuous elements that form a multidirectional two-dimensional fabric. The fabric may be woven, braided, knitted, a unidirectional sheet, or as in the example shown diagrammatically, a superposition of a plurality of unidirectional sheets of threads, cables, or twisted strands. The sheets are superposed with different directions and they are assembled together by light needling. By way of example, the base fabric could be made up of three unidirectional sheets disposed respectively at 0°, +60°, and −60° C. relative to an axis of the fabric. The base fabric may optionally be finished off with a thin web of fibers preneedled onto the fabric.

A first annular preform portion for a brake disk is made by stacking plies 12 while flat of the base fabric 10 and by bonding them together by needling. A plurality of thin felt layers 14 can be interleaved between each pair of plies 12. The term "thin felt layer" is used herein to mean a layer of felt having density per unit area of less than 500 g/m$^2$, e.g. lying in the range 200 g/m$^3$ to 300 g/m$^3$, and a fiber density of less than 20%, e.g. lying in the range 7% to 14% when in the relaxed state (prior to the compression that is due to needling). Needling is performed by means of a needling head 20 in the form of a needle board, with the plies being placed on a support 22 which is covered by a base felt 24 in which the needles can penetrate without being damaged. The length of the needle board corresponds substantially to the radial distance between the inner circumference and the outer circumference of the annular preform portion that is to be made. Each time a new ply 12 or layer 14 is deposited, an annular needling pass is performed. To this end, e.g. as described in document FR-A-2 626 294, one full revolution is performed between the needling head 20 and the support 22 about the axis of the preform portion, and during this revolution, a predetermined number of needling strokes is performed by causing the needles to penetrate into the preform portion that is being prepared, perpendicularly to the surface thereof. Rotation can be obtained by driving the needling head or the support 22 about the axis of the preform. On each pass, the depth of needling can be maintained substantially constant or it can be variable, e.g. increasing slightly, by lowering the support 22 step by step as the preform portion is built up. Once a thickness has been reached that corresponds substantially to the thickness of the core of the brake disk that is to be made, a plurality of finishing needling passes can be performed after the last ply has been needled, so as to obtain needling density per unit volume that is substantially constant. Methods of preparing preforms with substantially constant needling densities per unit volume are described in documents FR-A-2 584 106 and FR-A-2 726 013.

The preform portion 30 obtained in this way is finished off on each of its faces by a layer of felt of thickness that is selected as a function of the thickness required for the friction portions of the disk that is to be made. Thus, with the preform portion 30 being kept in place, a felt layer 16 is placed on the top face thereof and is bonded thereto by performing an annular needling pass in the above-described manner. The preform portion 30 fitted with its felt layer 16 is removed from the support 20 and the base felt 24, is turned over, and then put back into place so as to make it possible to dispose and needle another felt layer 18 on the other face, in the same manner as the layer 16.

In a variant, each felt layer 16, 18 can be replaced by two or more layers needled in succession onto the preform portion 30. It is also possible to use one or more felt layers to form a portion only of the thickness of the preform portions that correspond to the friction portions of the disk, with the remainder being formed by plies analogous to the plies 12, for example. In which case, the felt layer(s) is/are disposed adjacent to the outside face (the friction face). In all cases, each preform portion that corresponds to a friction portion of the disk has at least one relatively thick felt layer. The term "thick felt layer" is used herein to designate a layer having mass per unit area that is greater than 500 g/m$^2$, e.g. lying in the range 600 g/m$^2$ to 800 g/m$^2$, with a fiber density less than 20%, e.g. lying in the range 10% to 15% in the relaxed state. This corresponds substantially to a thickness after needling of not less than 1 mm, or to a thickness in the relaxed state of several millimeters, e.g. not less than 3 mm.

The preform portion 30 with the felt layers 16 and 18 is cut out by means of a punch so as to obtain an annular preform 32 for a brake disk having a first portion $32_1$ corresponding to the core of the disk and formed by the needled together plies 12 and layers 14, and two lateral portions $32_2$ and $32_3$ corresponding to the friction portions of the disk, formed by the felt layers 16 and 18.

Figure 2:
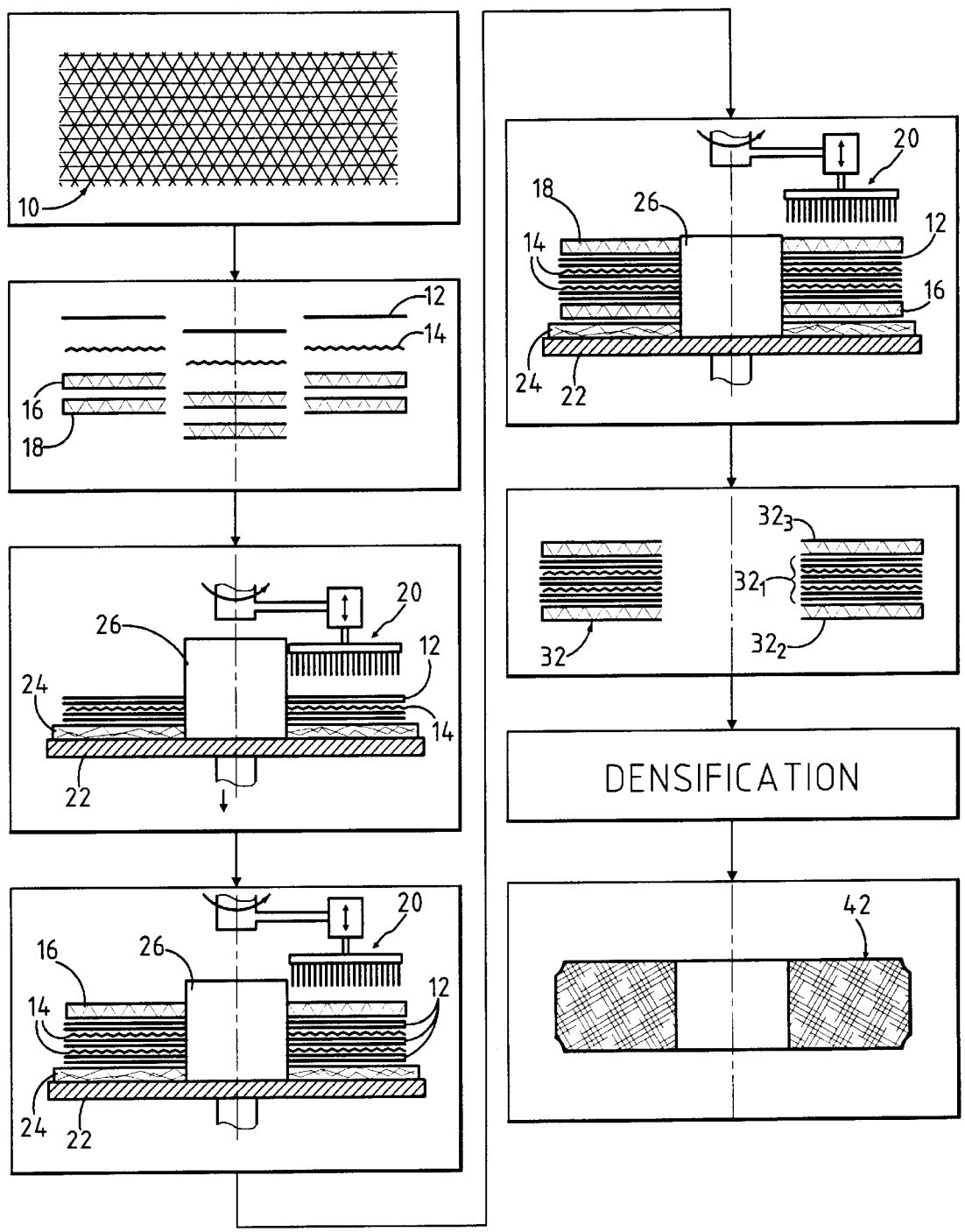
FIG. 2 shows the successive steps in making an annular preform for a disk brake in a variant of the method of FIG. 1.

Above, it is envisaged that the preform is cut out to its annular shape after it has been needled. In a variant, as shown in FIG. 2, it is possible to cut out the plies 12 and the felt layers 14, 16, and 18 so as to give them the desired annular shape prior to needling. The needling operation can be performed in a manner analogous to that described above, i.e. in successive annular needling passes. It is then preferable for the plies and layers of felt being needled to be held in place by means of tooling formed at least by a central hub 26 projecting axially from the support 22 carrying the annular base felt 24.

After forming a first preform portion 32, by needling annular plies 12 together with optional interposed annular thin felt layers 14, and after adding annular layers 16 and 18 on the faces of the preform portion 321 and bonding them thereto by needling so as to form the two preform portions $32_2$ and $32_3$, a brake disk preform 32 is obtained similar to that described above.

C—C composite brake disks 42 are made from preforms 32 prepared as described above by subjecting the preforms to an operation of densification by means of a carbon matrix, where appropriate after carbonization heat treatment if the preforms are made from carbon precursor fibers. In well known manner, densification is performed by chemical vapor infiltration or by a liquid technique.

The densified performs are then machined to give the disks 42 their final dimensions and to form the notches that are necessary for linking them to the member with which they are fast in rotation.

The above description envisages forming the annular preform by stacking plies of fiber fabric and layers of felt flat parallel to the faces of the disk.

In a variant, it is possible for the portion of the preform that corresponds to the core of the disk to make use of a spirally or helically wound strip of cloth optionally associated with a strip of thin felt, wound flat in superposed layers around a central hub, with the strip being needled as it is wound. A method of this type is described in the French patent application filed under the No. 95 14 000. In similar manner, for the or each portion of the preform corresponding to a friction portion of the disk, it is possible to use a felt strip that is wound to form superposed layers that are needled together.

Figure 3:
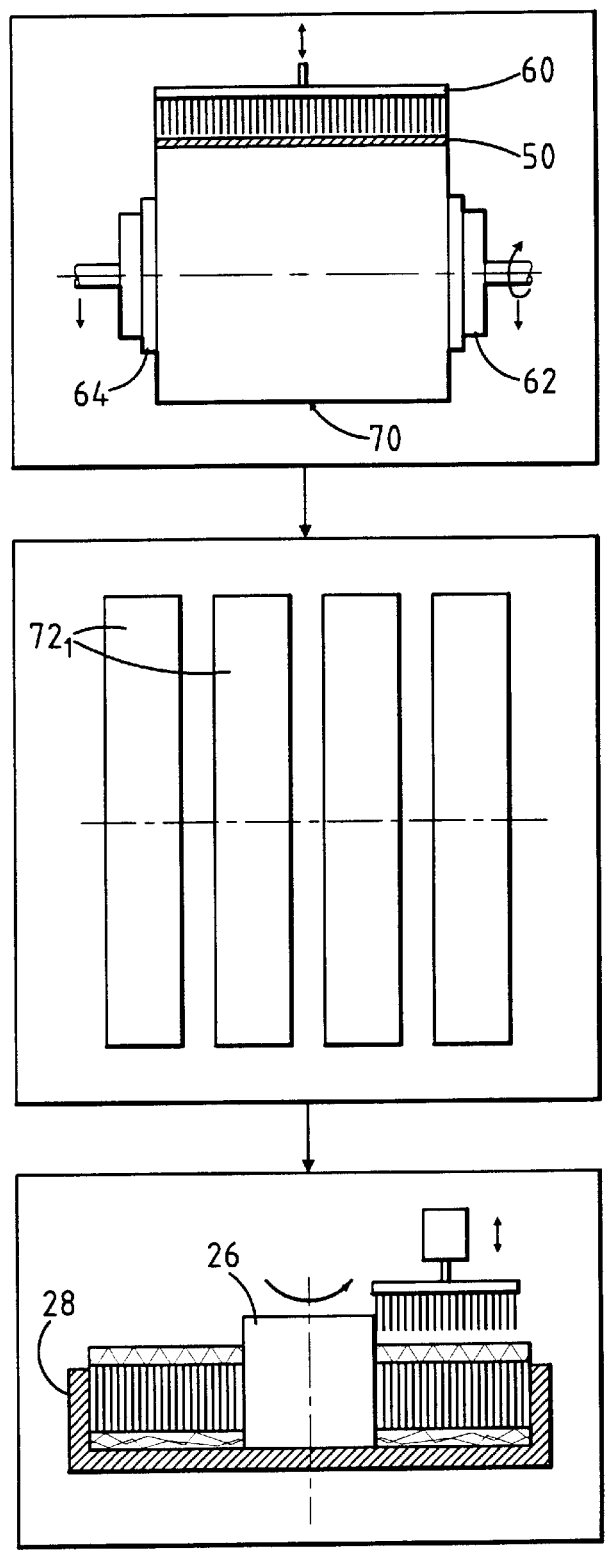
FIG. 3 shows the successive steps in making a portion of a disk brake preform in another implementation of the method of the invention.

In yet another variant, as shown in FIG. 3, the portion of the preform corresponding to the core of the disk is obtained from a strip 50 of fiber fabric wound in superposed layers on a mandrel. The strip 50 is a structural fabric, e.g. a woven cloth, optionally associated with a thin felt strip.

The strip 50 is needled substantially at the location where it is superposed on the layers that have already been wound. Needling is performed by means of a needle board 60 which extends across the width of the strip 50. By way of example, the mandrel 62 is a rotary mandrel fitted with a base layer 64 into which the needles can penetrate while needling the first layers. After one full revolution, the mandrel 62 is lowered relative to the needles so as to have a needling depth that is substantially constant, or that can be varied slightly in controlled manner. When the necessary number of layers 52 has been formed, finishing needling passes can be performed. A method of manufacturing cylindrical preforms with constant needling density per unit volume is described in document FR-A-1 584 107.

In a variant, it will be observed that the strip can be wound by making tangential contact with a roller, the mandrel being stationary and fitted with perforations in register with the needles, thereby making it possible to omit a base covering.

The resulting needled sleeve 70 is sliced in radial planes to form annular preform portions $72_1$ each corresponding to a brake disk core.

A preform portion corresponding to a brake disk friction portion and comprising at least one felt layer is then needled onto one or each face of the preforms $72_1$. The installation of FIG. 2 can be used for this purpose, advantageously associating it with a peripheral cylindrical wall 28 which, in co-operation with the central hub 26, ensures that the preform portion $72_1$ is guided.

EXAMPLE 1

C—C composite front brake disks for private vehicles of the "Mercedes E600" type were made as follows, using the method of FIG. 1.

The base fiber fabric used for the preform portion corresponding to the core of the disk was constituted by a laminate made up of three unidirectional sheets of pre-oxidized polyacrylonitrile (PAN) fibers having a mass per unit area of about 1000 g/m², superposed in three different directions (0°, +60 °, −60° C.), and preneedled with a thin felt having mass per unit area of about 300 g/m². A plurality of base fiber fabric plies were superposed while being needled together preferably so as to obtain constant needling density per unit volume, as described in document FR-A-2 584 106 or document FR-A-2 726 013, until a thickness of about 22 mm was obtained.

On each face of the preform portion obtained in that way, eight felt layers having a mass per unit area of about 800 g/m² were successively superposed and needled so as to obtain a thickness of about 10 mm. As before, each felt layer was needled so as to obtain needling at substantially constant density per unit volume.

An annular preform having inside and outside diameters respectively equal to 420 mm and to 180 mm was then cut out and subjected to carbonizing treatment so as to transform the preoxidized PAN into carbon, with the preform optionally being held in shape by tooling.

The preform was densified with a pyrolytic carbon matrix by chemical vapor infiltration.

Disks obtained in that way were tested together with prior art C—C composite material brake pads.

Figure 4:
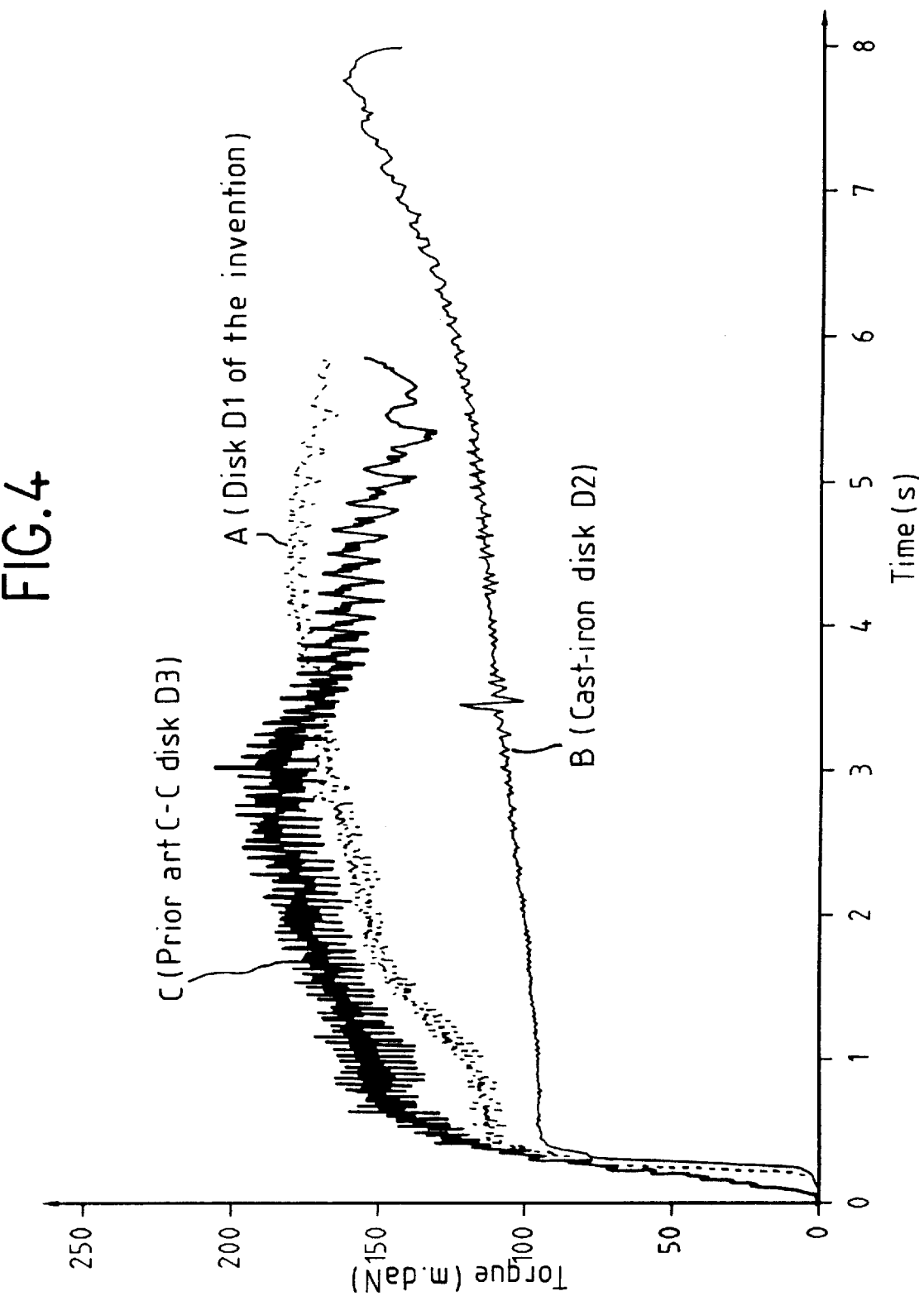
FIG. 4 is a graph in which the curves show how braking torque varies as a function of time during braking when using disks obtained in accordance with the invention and prior art disks.

A first braking test was performed in the dry using a brake disk D1 and brake pads obtained as mentioned above. Braking torque was measured continuously throughout the braking required to cause speed to pass from 200 km/h to 0. Curve A in FIG. 4 shows variation in torque measured as a function of time. By way of comparison, comparative tests were performed using the usual brake for the vehicle under consideration (cast iron brake disk D2) and using a prior art C—C composite brake disk D3. The prior art brake disk D3 differs from the disk D1 in that its preform was made entirely by needling together plies of the base texture 10 of FIG. 1, without incorporating any felt, whether in its friction faces or in its core. Curves B and C in FIG. 4 show how measured torque varied as a function of time when using the disks D2 and D3.

It will be observed that the time required for braking with C—C composite disks was 2 seconds (s) shorter than that obtained when using the cast iron disks (8 s down to about 6 s), however the disk D3 gave rise to instabilities in braking torque which gave rise to large amounts of vibration. These variations in braking torque were considerably smaller with the disk D1, and the improvement in torque stability (ratio between torque variation Δt and torque t) being more than 60%. It should also be observed that the stability S in the coefficient of friction $\mu$ was greatly improved, where S is the ratio of the difference between the maximum value $\mu_{max}$ and the minimum value $\mu_{min}$ as measured during the test and as divided by the computed mean value $\mu_{mean}$: [S=$(\mu_{max}-\mu_{min})$/$\mu_{mean}$] When using disks D1 of the invention, the value of S is 0.23 for braking in the dry and 0.39 for braking in the wet, whereas it is respectively 0.46 for braking in the dry and 0.61 for braking in the wet when using the prior art disks D3. In addition, braking torque, and thus braking effectiveness, increases during braking, which is not the case with the disk D3.

Figure 5:
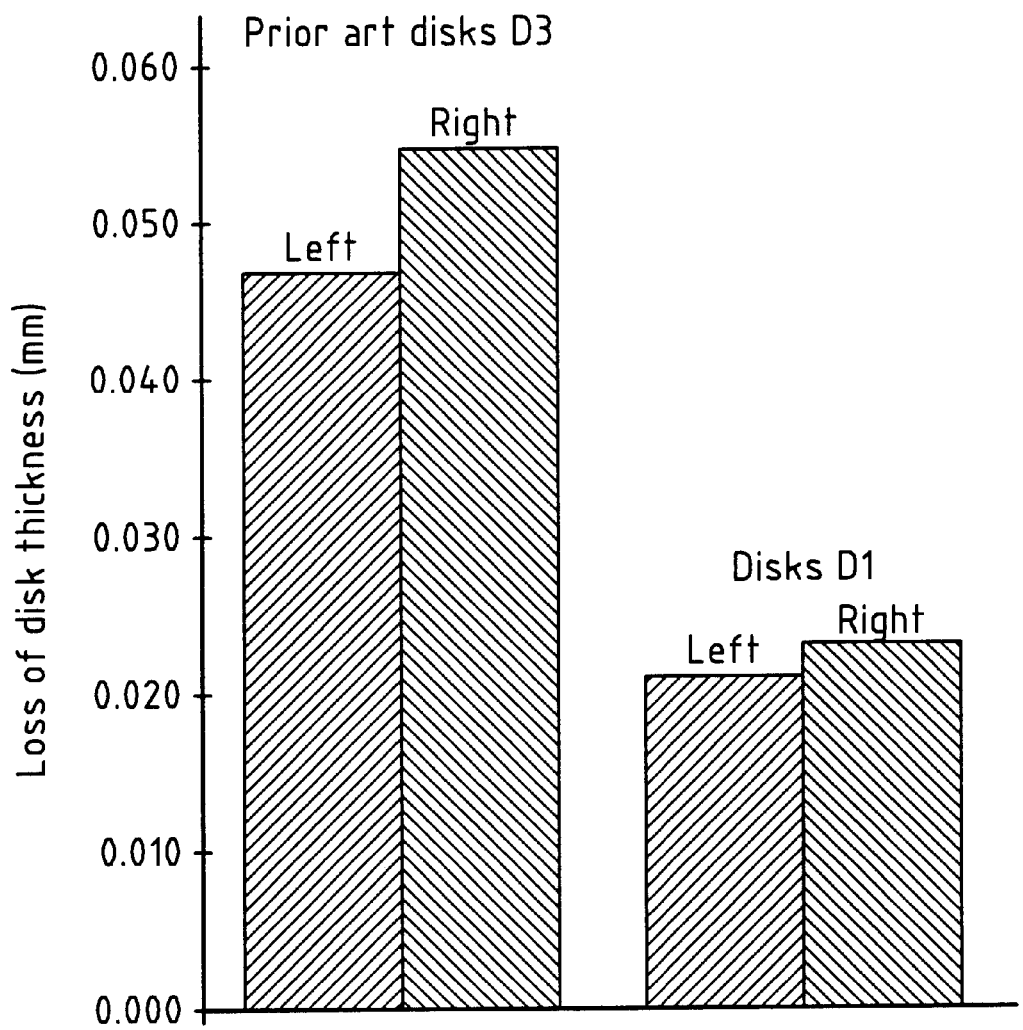
FIG. 5 is a bar chart showing wear as measured during braking when using brake disks obtained in accordance with the invention and a prior art brake disk.

A second series of dry braking tests was performed with disks mounted on the front axle of the vehicle in question of the "Mercedes E600" type. Wear on the left and right disks was measured respectively for the disks D1 and the disks D3. FIG. 5 shows the measured wear in terms of loss of thickness for the disks during high energy braking from 250 km/h to 100 km/h. Remarkably, the wear measured on the disks D1 obtained in accordance with the present invention was about half the wear measured with prior art C—C composite disks.

EXAMPLE 2

Figure 6:
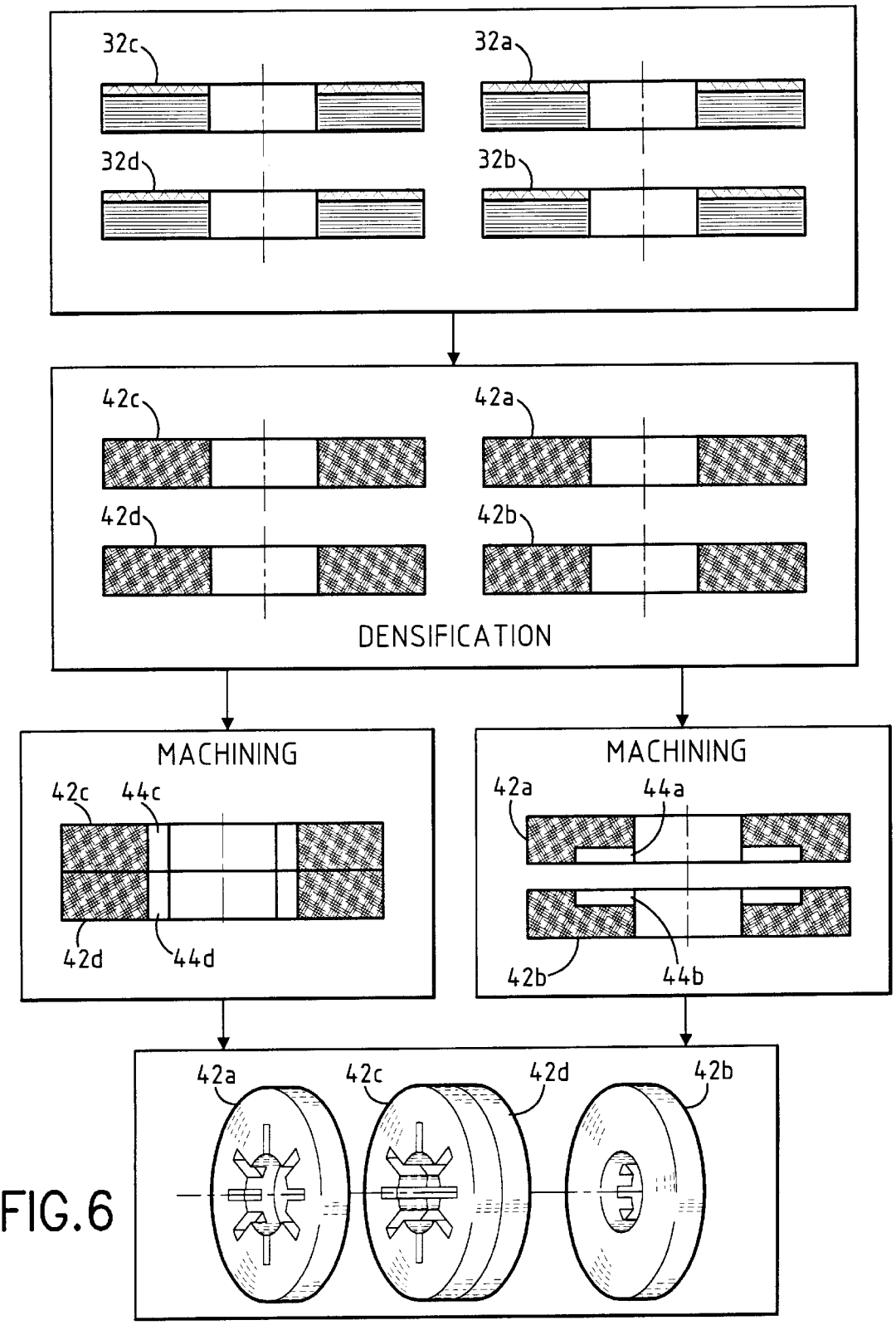
FIG. 6 shows the successive steps in making brake disks for a heavy truck, implementing the method of the invention.

An assembly comprising a rotor brake disk and two stator brake disks for a heavy truck disk brake was made as follows (FIG. 6).

Identical component annular preforms 32a, 32b, 32c, and 32d were prepared using the method of FIG. 1, as follows.

Each perform comprised a first portion corresponding to a portion of the core of a disk, formed by superposing and needling together layers of a base fiber fabric, e.g. identical to that used in FIG. 1. On one of the faces of that preform portion there were superposed and needled layers of felt to form a second preform portion corresponding to a disk friction portion.

After carbonization, the preforms 32a, 32b, 32c, and 32d were densified by a carbon matrix as described in Example 1.

Two stator disks 42a and 42b were thus obtained each having a core and a friction face corresponding to densified preforms 32a and 32b, and two rotor half-disks 42c and 42d were obtained for making up a rotor disk by being placed adjacent each other via their faces opposite from their friction faces. The stator disks were half the thickness of the rotor disks, which is entirely acceptable for the application under consideration.

The disks were machined so as to bring them to their final dimensions and form notches enabling them to be mounted. Thus, the rotor half-disks 42c and 42d were provided throughout their entire thickness with axial notches 44c and 44d extending from their inside faces for the purpose of co-operating with corresponding ribs on a shaft constrained to rotate with a heavy truck wheel. The rotor half-disks can be assembled together directly by being mounted on the shaft, e.g. by being mutually clamped together via their hubs. The stator disks 42a and 42b were provided with radial notches 44a and 44b extending from their inner circumferences and formed in a fraction only of the thickness of each disk starting from its rear face opposite from its friction face. The notches 44a and 44b were designed to co-operate with keys for transmitting braking forces to the chassis of the heavy truck. This method of providing mechanical linkage with the disk core makes it possible for the core portion of the preform to be obtained by winding a strip in superposed layers extending perpendicularly to the faces of the disk, as in the embodiment of FIG. 3. There is no risk of the transmitted forces delaminating the preform, i.e. causing its layers to separate from one another, as would be the case if forces were transmitted from notches formed in the outer periphery of the core of the disk, and across the entire thickness thereof.

The implementation of FIG. 6 is particularly advantageous in that it makes it possible to use standard preforms. In a variant, it may be observed that the assembly required for obtaining the rotor disk can be performed prior to densifying the original preforms. Naturally, the option of preparing each kind of disk preform separately is not excluded.

What is claimed is:

1. A method of manufacturing a brake disk made of a composite material having a fiber reinforcement densified by a matrix, the brake disk comprising a core portion and at least one friction portion adjacent to the core portion and having an outer friction face, the method comprising the steps of:
    preparing a fiber preform by forming a first fiber preform portion that is to constitute the fiber reinforcement of the core portion by superposing and bonding together by needling fiber layers comprising structural layers formed at least in part out of continuous filaments, and by forming at least one second fiber preform portion that is to constitute a fiber reinforcement of a friction portion of the disk, said second preform portion being constituted by at least one felt layer bonded to the first fiber preform portion by needling,
    densifying said fiber preform with a matrix, and
    machining said densified fiber preform to final dimensions of the brake disk, whereby a brake disk is obtained having a fiber reinforcement including structural layers in its core portion and having a fiber reinforcement constituted by felt adjacent the friction face of its at least one friction portion.

2. A method according to claim 1, characterized in that felt layers are interposed between said structural fiber layers of said first preform portion.

3. A method according to claim 1, characterized in that said structural layers are formed by turns of a helical cloth wound flat in superposed layers.

4. A method according to claim 1, characterized in that the forming of the first preform portion includes forming a cylindrical sleeve by winding a fiber fabric strip into superposed layers about a mandrel and cutting the sleeve into slices along radial planes to obtain a plurality of first preform portions.

5. A method according to claim 1, characterized in that said at least one felt layer constituting the at least one second preform portion has a fiber volume density of less than 20%.

6. A method of manufacturing a composite material braking assembly comprising a central rotor brake disk having a core portion and two friction portions adjacent to the core portion on either side thereof and each having a friction face, and two stator disks coaxially arranged with said rotor disk on either side thereof, each stator disk having a core portion and one friction portion adjacent to the core portion and having a friction face facing a respective friction face of the rotor disk, said disks being in a composite material having a fiber reinforcement densified by a matrix, said method comprising the steps of:
    preparing four substantially identical fiber preforms, each by forming a first fiber preform portion that is to constitute the fiber reinforcement of at least a part of a core portion of a disk by superposing and bonding together by needling fiber layers comprising structural layers formed at least in part out of continuous filaments, and by forming a second fiber preform portion that is to constitute a fiber reinforcement of a friction portion of a disk, said second preform portion being constituted by at least one felt layer bonded to the first fiber preform portion by needling,
    densifying the four fiber preforms with a matrix,
    putting two of the densified fiber preforms together via their first preform portions so as to obtain a densified preform for a rotor disk having two friction portions, and machining said two densified preforms to the final dimensions of a rotor disk, and
    machining each of the two other densified preforms to the final dimensions of a stator disk,
    whereby a braking assembly is obtained with a rotor disk and two stator disks each having a fiber reinforcement including structural layers in its core portion and having a fiber reinforcement constituted by felt adjacent the friction face of its friction portion(s).

7. A method according to claim 6, characterized in that said step of putting two fiber preforms together via their first preform portions is carried out prior said step of densifying the fiber preforms with a matrix.

8. A method according to claim 6, characterized in that the final machining of each stator disk comprises forming notches that extend radially, and over a depth smaller than the thickness of the core portion of the disk, from a rear face of the disk opposite from its friction face.

9. A method according to claim 8, characterized in that the forming of each first preform portion includes forming a cylindrical sleeve by winding a fiber fabric strip into superposed layers about a mandrel.

10. A method according to claim 7, characterized in that the final machining of each stator disk comprises forming notches that extend radially, and over a depth smaller than the thickness of the core portion of the disk, from a rear face of the disk opposite from its friction face.

11. A method according to claim 10, characterized in that the forming of each first preform portion includes forming a cylindrical sleeve by winding a fiber fabric strip into superposed layers about a mandrel.

12. A brake disk in a composite material having a fiber reinforcement densified by a matrix, the disk comprising a core portion and at least one friction portion adjacent the core portion and having an outer friction face, wherein the fiber reinforcement of the core portion of the disk comprises structural fiber layers formed at least in part by continuous filaments, and the fiber reinforcement of the at least one friction portion is constituted of at least one felt layer, at least in its part adjacent to the friction face, said structural layers and at least one felt layer of the fiber reinforcement being needled together.

13. A brake disk according to claim 12, characterized in that said felt layer has a fiber volume density of less than 20%.

14. A brake disk according to claim 12, characterized in that said at least one friction portion of said disk comprises, by volume, 10% to 15% fibers, 65% to 75% matrix, and 15% to 20% residual pores.

15. A brake disk according to claim 12, characterized in that said fiber reinforcement of the core portion of the disk has felt layers interleaved between structural fiber layers.

16. A brake disk according to claim 12, characterized in that said fiber reinforcement of the core portion of the disk comprises structural fiber layers parallel to the faces of the disk.

17. A brake disk according to claim 12, characterized in that said fiber reinforcement of the core portion of the disk comprises structural fiber layers perpendicular to the faces of the disk.

18. A brake disk according to claim 12, characterized in that said fiber reinforcement and the matrix are made of carbon.

19. Braking apparatus for a private car, characterized in that it comprises at least one brake disk according to claim 12, co-operating with brake pads.

20. Braking apparatus for a heavy road vehicle, characterized in that it comprises at least one assembly of two stator disks and one rotor disk according to claim 12.

21. Braking apparatus according to claim 20, characterized in that each stator disk has radial notches formed over a fraction of the thickness of the disk in its face opposite to its friction face.

* * * * *

UNITED STATES PATENT AND TRADEMARK OFFICE
CERTIFICATE OF CORRECTION

PATENT NO. : 6,767,602 B1
DATED : July 27, 2004
INVENTOR(S) : Renaud Duval et al.

It is certified that error appears in the above-identified patent and that said Letters Patent is hereby corrected as shown below:

Column 6,
Line 40, "32," should read -- $32_1$ --; and
Line 43, "321" should read -- $32_1$ --.

Signed and Sealed this

Fifteenth Day of November, 2005

JON W. DUDAS
*Director of the United States Patent and Trademark Office*